US012792807B2

(12) United States Patent
Fischer et al.

(10) Patent No.: US 12,792,807 B2
(45) Date of Patent: Nov. 10, 2026

(54) METHOD FOR CHECKING THE INTEGRITY OF RELOADABLE FUNCTIONAL UNITS

(71) Applicant: Siemens Aktiengesellschaft, Munich (DE)

(72) Inventors: Bernhard Fischer, Wolkersdorf im Weinviertel (AT); Martin Matschnig, Tulin (AT); Joubin Djavan, Regelsbrunn (AT); Christian Cech, Ebreichsdorf (AT); Thomas Hinterstoisser, Bisamerg (AT)

(73) Assignee: Siemens Aktiengesellschaft, Munich (DE)

( * ) Notice: Subject to any disclaimer, the term of this patent is extended or adjusted under 35 U.S.C. 154(b) by 833 days.

(21) Appl. No.: 18/031,794

(22) PCT Filed: Aug. 31, 2021

(86) PCT No.: PCT/EP2021/073994
§ 371 (c)(1),
(2) Date: Apr. 13, 2023

(87) PCT Pub. No.: WO2022/078668
PCT Pub. Date: Apr. 21, 2022

(65) Prior Publication Data

US 2023/0385500 A1 Nov. 30, 2023

(30) Foreign Application Priority Data

Oct. 15, 2020 (EP) .................................... 20201967

(51) Int. Cl.

| | |
|---|---|
| ***G06F 30/343*** | (2020.01) |
| ***G06F 21/57*** | (2013.01) |
| *G06F 115/02* | (2020.01) |

(52) U.S. Cl.
CPC .......... *G06F 30/343* (2020.01); *G06F 21/572* (2013.01); *G06F 2115/02* (2020.01); *G06F 2221/033* (2013.01)

(58) Field of Classification Search
CPC .. G06F 30/343; G06F 21/572; G06F 2115/02; G06F 2221/033; G06F 11/1641; G06F 11/1433; G06F 21/76; G06F 30/34
(Continued)

(56) References Cited

U.S. PATENT DOCUMENTS

| | | | | |
|---|---|---|---|---|
| 8,959,469 B2 * | 2/2015 | Chen | ....................... | G06F 30/34 716/121 |
| 2019/0180041 A1 | 6/2019 | Bhunia et al. | | |
| 2020/0028511 A1 | 1/2020 | Yu et al. | | |

FOREIGN PATENT DOCUMENTS

| | | |
|---|---|---|
| EP | 3702947 | 9/2020 |

OTHER PUBLICATIONS

PCT International Search Report dated Jan. 3, 2020 based on PCT/EP2021/073994 filed Aug. 31, 2021.

* cited by examiner

*Primary Examiner* — Paul Dinh
(74) *Attorney, Agent, or Firm* — Cozen O'Connor

(57) ABSTRACT

A method for checking the integrity of functional units that are reloadable during runtime of an electronic component in a dynamically reconfigurable region of the electronic component, wherein the electronic component, which is formed as a programmable logic circuit, has, in addition to a static region, a dynamically reconfigurable region and the reloadable functional units have predefined interfaces, where an associated twin functional unit is configured in a specified subregion of the dynamically reconfigurable region for each reloadable functional unit, a reloadable functional unit is loaded into a specified subregion of the dynamically recon-
(Continued)

figurable region, supplied with identical input data to the associated twin functional unit, and executed in parallel with the twin functional unit, and where output data of the reloaded functional unit and associated twin functional unit are compared and the reloaded functional unit is enabled if a match between the two output data is found.

11 Claims, 3 Drawing Sheets

(58) Field of Classification Search
USPC .......................................................... 716/136
See application file for complete search history.

METHOD FOR CHECKING THE INTEGRITY OF RELOADABLE FUNCTIONAL UNITS

CROSS-REFERENCE TO RELATED APPLICATIONS

This is a U.S. national stage of application No. PCT/EP2021/073994 filed 31 Aug. 2021. Priority is claimed on European Application No. 20201967.5 filed 15 Jul. 2020, the content of which is incorporated herein by reference in its entirety.

BACKGROUND OF THE INVENTION

1. Field of the Invention

The present invention relates generally to the field of programmable logic circuits, such as field programmable gate arrays (FPGAs), and more specifically, to a method for checking the integrity of reloadable functional units or hardware applications, which can be reloaded as configuration files into a dynamically reconfigurable region of the electronic component during a runtime of the electronic component, where the electronic component comprises a programmable logic circuit, i.e., a field programmable gate array (FPGA) or as a system-on-chip FPGA (SoC FPGA), and includes at least one dynamically reconfigurable region in addition to a static region, and where the reloadable functional units have predefined interfaces that match corresponding interfaces of those sub-regions of the dynamically reconfigurable region of the electronic component into which the reloadable functional units can be loaded.

2. Description of the Related

Integrated circuits, such as application-specific integrated circuits (ASICs), field programmable gate arrays (FPGAs) or system-on-chip FPGAs (SoC FPGAs), are electronic components used in many electrical and/or electronic devices or systems today. Especially with the help of electronic components, which are designed as programmable integrated circuits (e.g., FPGAs, or SoC FPGAs), various logic circuits and functions can be realized by an appropriate configuration, which range, e.g., from simple counters or interfaces for digital components to highly complex circuits (e.g., memory controllers, or microprocessors). Programmability refers not only to the specification of time sequences, but above all to the definition of a circuit structure in order to achieve a desired circuit function or function.

The definition of the entire circuit or circuit function of the electronic component occurs during a design phase and is formulated, for example, in a hardware description language (e.g., VHDL, and/or Verilog). During a synthesis phase, the definition of the logic circuit is translated, for example, via generator software or a synthesis tool, into a "netlist", from which a physical layout is then finally generated by "placement" and "routing". A corresponding configuration file is then derived from the netlist, via which a configuration or interconnection of the physical elements of the electronic component or the programmable integrated circuit can be predetermined (for the entire circuit), but at least for individual circuit parts or functional units.

By loading at least one configuration file into the electronic component, logic circuit functions consisting of various functional units or circuit parts can be realized based on a corresponding basic structure of the electronic component.

The basic structure of a programmable integrated circuit, such as an FPGA or SoC FPGA, is an array of up to millions of configurable basic elements. Loading of the respective configuration files can be performed from an internal or external non-volatile memory unit.

Due to their basic structure, programmable integrated circuits, such as FPGAs, SoC FPGAs, offer the advantage that the logic circuit function or only individual circuit parts, i.e., individual functional units, can be changed as required. For example, to reconfigure a mode of operation of a programmable integrated circuit, a current configuration of the electronic component is deleted and a new configuration file is loaded, which is used to reconfigure the component. Instead of using a configuration file to configure the entire electronic component, it is possible to use one or more configuration files that reconfigure only sub-regions of the electronic component or the programmable integrated circuit, while other regions of the electronic component remain unchanged, i.e., static. This method is called partial reconfiguration. In the design phase of the overall circuit function of the electronic component, it is possible to determine, for example, which region of the electronic component should remain unchanged, i.e., static, and which region can be changed, i.e., should be reconfigurable, where the reconfigurable region can be divided into a plurality of sub-regions.

For partial reconfiguration, an electronic component or a programmable integrated circuit can, for example, either be put out of operation or switched off, or the partial reconfiguration is performed on an active electronic component during operation or at runtime. That is, one or more sub-regions specified as reconfigurable are changed during runtime, while the rest of the circuitry, such as the region specified as static and, if applicable, dynamically reconfigurable sub-regions that are not to be reconfigured, remain in operation. A partial reconfiguration of an active electronic component or during a runtime of the electronic component is called dynamic partial reconfiguration (DPR). Runtime or running operation of the electronic component, such as an FPGA, can be understood to particularly mean a period of time after loading the configuration (in the form of at least one configuration file), i.e., a period of time at which the electronic component can be used in accordance with the configuration determined by the at least one configuration file.

The DPR allows functional units ("hardware applications") to be dynamically reloaded into corresponding sub-regions of the region of the electronic component defined as dynamically reconfigurable and then enabled during running operation of the electronic component. The dynamically reconfigurable sub-regions are also referred to as containers, slots or partitions, for example, and are defined during the design phase of the electronic component. Reloadable functional units or hardware applications, for example, are loaded by a control unit as configuration or load files from an internal or external storage unit (e.g., flash memory, SD card, or manufacturer-specific application store) during the running operation into corresponding dynamically reconfigurable sub-regions or containers, which are then configured accordingly. The control unit is integrated or provided by the respective manufacturer of the electronic component (e.g., Xilinx, and/or Intel (formerly Altera)) in the static region of the integrated circuit. The configuration file is usually executed as a bitstream file, which is used to map an algorithm and thus a predefined mode of operation of the hardware application in the corresponding container and thus in the basic structure of the electronic component.

Furthermore, the reloadable functional units or hardware applications have predefined interfaces for input and output signals, which must accordingly match implemented interfaces for input and output signals of the respective dynamically reconfigurable sub-region or container in the dynamically reconfigurable region of the electronic component. That is, not every hardware application can be loaded into every container or a container can only be configured with a corresponding configuration file of a hardware application that has the appropriate interface configuration for the respective input and output signals.

For securely loading a reloadable functional unit or hardware application into a partially reconfigurable container, a checksum of the associated configuration file is usually created and then the associated configuration file is encrypted. When the hardware application or the associated configuration file is loaded, it is decrypted, e.g., by the control unit, e.g., in a trusted programming environment within the dynamically reconfigurable region of the electronic circuit, and the integrity of the configuration file and thus of the hardware application is checked via the checksum (e.g., via cyclic redundancy check (CRC)). If the integrity (i.e., correctness (absence of errors, no modifications) and trustworthiness of the functional unit or the associated configuration file) is determined based on this check, then the dynamically reconfigurable container intended for the hardware application is occupied with the reloaded functional unit, i.e., configured accordingly with the associated configuration file.

One approach for checking integrity is known, for example, in the document "Error Detection and Recovery Using CRC in Altera FPGA Devices", Altera, Application note 357, July 2008, Version 1.4, with which the integrity or trustworthiness of a configuration file of a reloadable functional unit is checked by the electronic component, where errors in the file can also be detected and recovered up to a specified number of bits. However, such integrity checks built into the component for functional units or associated configuration files require additional resources within the electronic component or programmable integrated circuit.

Furthermore, the integrity of a reloadable functional unit or hardware application can be compromised after the corresponding container has been configured, such as due to incorrect programming of the container. As a result, the hardware application can no longer run correctly, for example, and this can lead to disturbances, malfunctions, and damage in the electronic component. Even during the runtime of a reloadable functional unit, it may lose, e.g., its specified mode of operation or functionality, e.g., due to material aging of the electronic component, in particular of the reconfigurable basic structure or, e.g., due to exposure to ionizing radiation or temperature changes. This can result, e.g., in bit errors ("bit flips") that can lead to an incorrect status of the functional unit, and/or to faulty output signals. The integrity check via a checksum is usually performed when loading the configuration file of the functional unit from an internal or external storage unit. Consequently, such integrity problems usually remain undetected until problems, such as malfunctions and/or damage, occur in the electronic component.

Furthermore, if the reloadable functional units or associated configuration files had been tampered with before the checksum was created and the file was encrypted, or if an incorrect version of a functional unit or hardware application was loaded, then this can only be detected by an integrity check using checksum checks because the functional unit or hardware application is faulty or does not operate as specified. However, this may have already caused damage in or to the electronic component or in the circuit implemented with it.

SUMMARY OF THE INVENTION

In view of the foregoing, it is therefore an object of the invention to provide a method for checking the integrity of reloadable functional units or hardware applications, which are loaded at runtime via associated configuration files into corresponding sub-regions of a dynamically reconfigurable region of an electronic component, via which error-free and correct functioning of a reloadable functional unit in the electronic component is quickly detected in a simple and reliable manner and with little use of resources.

This and other objects and advantages are achieved by a method for checking the integrity of reloadable functional units or hardware applications. These functional units are reloaded during a runtime into an electronic component designed as a programmable integrated circuit into sub-regions, "containers", slots or partitions, of a dynamically reconfigurable region of the electronic component. The reloadable functional units have predefined interfaces that match corresponding interfaces of those sub-regions of the dynamically reconfigurable region into which the reloadable functional units can be loaded, i.e., a respective reloadable functional unit or hardware application can only be reloaded into a sub-region or container or slot with the correspondingly matching interfaces. For the integrity check of a reloadable hardware application, an associated, functionally identical and trusted twin functional unit is provided for each reloadable functional unit in a predefined sub-region (container or slot) of the dynamically reconfigurable region, e.g., during a startup process or boot process of the electronic component. That is, given sub-regions of the dynamically reconfigurable region are preconfigured with the twin functional units for reloadable functional units. During operation or at runtime of the electronic component, reloadable functional units can then be reloaded into the containers of the dynamically reconfigurable region specified by the interface definitions. The respective loaded reloadable functional unit and the associated twin functional unit are then supplied with identical input data and executed in parallel. The output data generated by the reloaded functional unit is compared with the output data of the associated trusted twin functional unit, and if there is a match between the output data of the loaded reloadable functional unit and the output data of the associated twin functional unit, then the loaded reloadable functional unit is enabled and its output data is forwarded for further processing.

The main aspect of the present invention is that for each functional unit that can be reloaded into the dynamically reconfigurable region at runtime of the electronic component, a trusted associated twin functional unit is provided, e.g., by the manufacturer as early as in the design phase of the electronic component. This twin functional unit has, for example, a standard functionality identical to that of the respective reloadable functional unit, i.e., the twin functional unit has the same interfaces and is loaded into the same container type as the respective reloadable functional unit or hardware application, for example, when the electronic component is started up or booted. This allows the twin functional unit to process the same input data as the reloadable functional unit, and the output data from the twin functional unit can be used to check the integrity of the reloaded functional unit in a simple manner and without requiring a large amount of resources. This means that the respective twin functional unit represents a "golden" reference for checking that the respective, reloaded functional unit or hardware application is functioning correctly and without errors.

Furthermore, an integrity check of the hardware application via a checksum and encryption of the configuration file associated with the reloadable functional unit can be omitted or used for additionally checking the integrity when loading the configuration file of the respective functional unit. In addition, however, the method in accordance with the invention also allows a reloadable functional unit to be checked while it is already in use in the electronic component, if it is suspected of not functioning properly, e.g., due to damage during or after configuration of the corresponding container or due to tampering. Furthermore, the method in accordance with the invention enables a user of an electronic component to reload functional units or hardware applications from manufacturers other than the manufacturer of the electronic component, provided that these functional units match the interfaces of the corresponding containers. With the method in accordance with the invention, it is then very simple, after loading the corresponding reloadable functional unit as configuration data into the respective container, to check via the corresponding twin functional unit whether the reloadable functional unit of another manufacturer fulfills at least that standard functionality that is necessary for proper operation of the electronic component.

In an expedient embodiment of the invention, if the output data of the reloadable functional unit deviates from the output data of the associated twin functional unit, then the reloadable functional unit is disabled or not enabled and an alarm message is output. This quickly detects a faulty or compromised reloaded functional unit. Furthermore, a compromised or faulty reloaded functional unit is easily prevented from causing malfunctions and/or damage of the electronic component.

It is further advantageous if the output data of the reloadable functional unit and the output data of the associated twin functional unit are forwarded to a comparison logic for comparison. The comparison logic is ideally configured in the dynamically reconfigurable region as static, e.g., when the electronic component is booted or started up. The corresponding configuration of the comparison logic can, for example, be defined as early as in the design phase of the electronic component. Ideally, the comparison logic is arranged, with respect to a data flow, between the interfaces for the output data of the functional units of the respective sub-regions and at least one further output interface in the dynamically reconfigurable region, via which the output data of one or more functional units are forwarded, for example, from the dynamically reconfigurable region to further units that are usually arranged in a static region of the electronic component (e.g., processor, CPU, and/or memory management). This at least one further output interface can also be defined, for example, during start-up of the electronic component, and is usually identical to the respective predefined interfaces of the containers for the reloadable functional units.

It is further advantageous if the output data of the reloadable functional unit and the output data of the associated twin functional unit are compared for a predetermined time duration. This provides a safe way to check the consistency of the output data and thus the consistency of the operation of the reloaded hardware application with the associated twin functional unit.

Ideally, the test data sequence used for comparing the output data of the reloadable functional unit and the output data of the associated twin functional unit is a predetermined test data sequence used as input data. For example, the length of the predetermined test data sequence can be used to determine the time duration of the comparison of the output data. For example, a test vector can be used as a predetermined test data sequence, through which a standard functionality of the reloaded functional unit can be checked based on the comparison of the output data with the output data from the associated twin functional unit.

In a preferred embodiment of the invention, the twin functional unit, which is configured for each reloadable functional unit or at least for that reloadable functional type, is loaded from a secure and trusted memory region into the predetermined sub-region of the dynamically reconfigurable region of the electronic component. That is, the respective twin functional units are defined, for example, by the electronic component manufacturer or a trusted design vendor during the design phase and are stored and loaded, for example, together with the base configuration or the configuration of the static region of the electronic component, which is loaded into the electronic component, for example, during boot-up. This is also to ensure that the respective twin functional units are protected from malicious tampering.

Furthermore, this is recommended if the respective configuration file for the respective reloadable functional unit is executed as a "bitstream file", which is reloaded from an internal or external storage unit (e.g., flash memory, SD card, manufacturer-specific application store) at runtime of the electronic component. A bitstream file usually includes information for programming the programmable integrated circuit or corresponding circuit parts. The bitstream file is usually generated in a synthesis phase from a "netlist", which has been derived from a design of the circuit or circuit parts created in a design phase. Typically, such bitstream files have a format that is specific to the particular manufacturer of the electronic component or programmable integrated circuit.

Ideally, a field programmable gate array (FPGA) is used as the electronic component. With FPGAs, different circuits and functions can be realized in a simple way (by loading configuration files) and can be flexibly changed.

Alternatively, a system-on-chip field programmable gate array (SoC FPGA) can be used as the electronic component, which ideally has the processor and FPGA architecture integrated into a single unit. In most cases, the processor part of the SoC FPGA is purpose-built and designed to be static or unchangeable, while the FPGA part can be at least partially reconfigured dynamically at runtime. This ideally enables higher integration, lower power consumption, smaller size, and greater bandwidth for communication between the processor part and the FPGA part.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below in an exemplary manner with reference to the accompanying figures, in which.

DETAILED DESCRIPTION OF THE EXEMPLARY EMBODIMENTS

Figure 1:
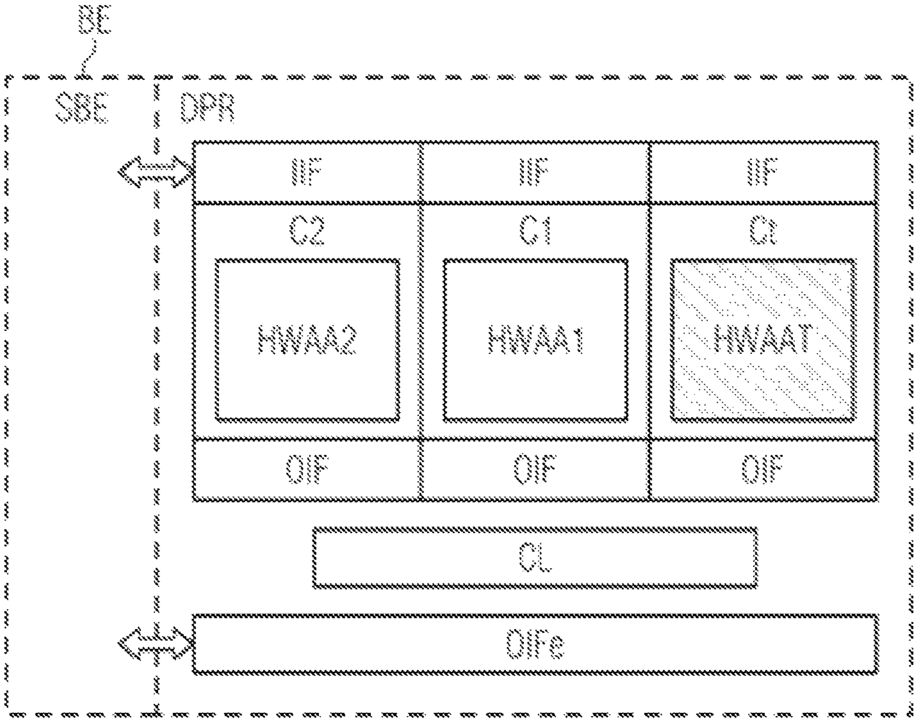
FIG. 1 shows a schematic and exemplary structure of an electronic component which is set up to perform the method in accordance with the invention for checking the integrity of reloadable functional units.

FIG. 1 schematically shows an exemplary structure or an exemplary configuration of an electronic component BE, which is set up to perform the method in accordance with the invention for checking the integrity of reloadable functional units HWAA1, HWAA2. The electronic component BE is formed, for example, as a programmable or reconfigurable integrated circuit, such as a field programmable gate array (FPGA) or a system-on-chip FPGA (SoC FPGA).

The exemplary electronic component BE shown in FIG. 1 has a static region SBE and also has a dynamically reconfigurable region DPR. In a design phase of the electronic component BE, for example, it is possible to determine which region of the electronic component BE is to be dynamically reconfigurable. In the static region SBE of the electronic component BE, for example, there can be provided at least one or more processor units, units for memory management, etc., as well as a control unit for reloading the reloadable functional units or hardware applications HWAA1, HWAA2 in the form of configuration files and for reconfiguring the dynamically reconfigurable region DPR.

The dynamically reconfigurable region DPR represents a part of the electronic component BE that can be at least partially reconfigured at runtime of the electronic component BE, which due to its basic structure can be changed as required by reloading individual functional units or hardware applications HWAA1, HWAA2 in the form of configuration files. Here, the dynamically reconfigurable region can be divided into a plurality of sub-regions C1, C2, Ct, which can also be referred to as containers, slots or partitions. The containers C1, C2, Ct have predetermined interfaces IIF, OIF, via which, for example, input and output data (e.g., signals, control signals, and/or register contents) can be exchanged with units of the static part SBE of the electronic component BE. The subdivision of the dynamically reconfigurable region DPR into predefined containers C1, C2, Ct as well as the definition of the interfaces IIF, OIF are, e.g., also defined in the design phase of the component BE, e.g., by the manufacturer, and are usually static.

At runtime of the electronic component BE, functional units or hardware applications HWAA1, HWAA2 can then be loaded into the predefined sub-regions or containers C1, C2 in the form of a configuration file, which then determines the functionality of the respective sub-region C1, C2. The configuration files of the hardware applications HWAA1, HWAA2 are usually executed as bitstream files and can be reloaded, for example, from an internal or external storage unit with the aid of the control unit into the respective container C1, C2 during operation of the component BE. The reloadable hardware applications HWAA1, HWAA2 have predefined interfaces, which must match the interfaces IIF, OIF of the containers C1, C2. This means that a certain reloadable functional unit or hardware application HWAA1, HWAA2 can only be reloaded into a certain type of container C1, C2. This container type C1, C2 must have the correspondingly defined interfaces IIF, OIF for the input data to be processed by the reloadable functional unit HWAA1, HWAA2 and for the output data to be supplied by the reloadable functional unit HWAA1, HWAA2.

In the exemplary electronic component BE shown in FIG. 1, the dynamically reconfigurable region DPR is divided, for example, into three exemplary containers C1, C2, Ct, where, for example, reloadable functional units HWAA1, HWAA2 can be dynamically loaded into a first and second container C1, C2, which have the interfaces matching the containers C1, C2. Here, the reloadable functional units HWAA1, HWAA2 have, for example, the same function type, i.e., the functional units HWAA1, HWAA2 process, for example, the same input data and supply the same output data. If the first and second containers C1, C2 have, for example, the same corresponding predefined input and output interfaces IFF, OIF, then the hardware applications HWAA1, HWAA2 can be reloaded into the first and/or second containers C1, C2 during the runtime of the electronic component BE, depending on the use of the component BE.

In the third exemplary container Ct of the dynamically reconfigurable region DPR, a twin functional unit or twin hardware application HWAAT is preconfigured for performing the method in accordance with the invention, which has the same standard functionality as the hardware applications HWAA1, HWAA2 that can be reloaded at runtime. That is, the logical function or algorithm of the twin functional unit HWAAT corresponds to the logical function or algorithm of the reloadable functional units HWAA1, HWAA2. The twin functional unit HWAAT therefore processes the same input data or supplies the same output data as the reloadable functional units HWAA1, HWAA2. For this purpose, the container Ct specified for the twin functional unit HWAAT in the dynamically reconfigurable region DPR has the same interfaces IIF, OIF for the input and output data as the first and second containers C1, C2. However, the twin functional unit HWAAT is defined, e.g., by the manufacturer as early as in the design phase and predetermined by a configuration of the electronic component BE, e.g., as fixed or static in the dynamically reconfigurable region DPR of the electronic component BE. As a result, the twin functional unit HWAAT is considered trustworthy by the electronic component BE or its logic.

Furthermore, the electronic component BE has comparison logic CL in the dynamically reconfigurable region DPR. The comparison logic CL can also be predetermined in the design phase as a non-changeable or fixed sub-region in the dynamically reconfigurable region DPR (similar to the interfaces IIF, OIF of the containers C1, C2, Ct). With the comparison logic CL, the output data of a functional unit HWAA1, HWAA2 reloaded at runtime can be compared with the output data of the corresponding, predefined twin functional unit HWAAT. The comparison logic CL here is arranged with respect to a data flow between the output interfaces OIF of the containers C1, C2, Ct and a further output interface OIFe, via which, for example, output data from the dynamically reconfigurable region DPR is forwarded to the units in the static region SBE. The output data of the reloadable functional units HWAA1, HWAA2 can be routed via the output interfaces OIF of the associated containers C1, C2 either to the comparison logic CL or directly to the output interface OIFe after checking the integrity. The output interface OIF of the container Ct of the twin functional unit HWAAT can, for example, be connected both to the comparison logic CL and directly to the output interface OIFe for integrity check.

Figure 2:
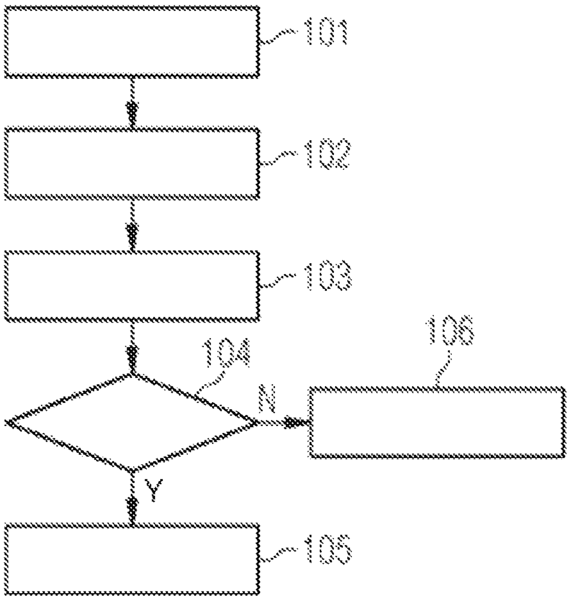
FIG. 2 shows an exemplary sequence of the method in accordance with the invention for checking the integrity of reloadable functional units in an electrical component.

FIG. 2 shows an exemplary sequence of the method in accordance with the invention for checking the integrity of reloadable functional units in an electrical component BE with a dynamically reconfigurable region DPR, which has at least one sub-region or container C1, C2, into which a corresponding reloadable functional unit HWAA1, HWAA2 can be reloaded in the form of a configuration file at runtime of the electronic component BE.

For the method in accordance with the invention, in a configuration step 101 predetermined sub-regions Ct of the dynamically reconfigurable region DPR are occupied by twin functional units HWAAT that have the same functionalities as the functional units HWAA1, HWAA2 that can be reloaded at runtime of the electronic component BE. That is, in the configuration step 101, for each reloadable functional unit or hardware application HWAA1, HWAA2, a predetermined sub-region or container Ct is configured with an associated twin functional unit HWAAT, where the occupancy of the sub-regions or containers Ct in the respective twin functional units HWAAT is static (i.e., cannot be changed during the runtime of the electronic component BE) and is predetermined, for example, by the manufacturer. The respective twin functional units HWAAT here are loaded, for example, during a boot phase of the electronic component BE in the form of corresponding configuration files or with a configuration for the electronic component BE from a secure and trusted memory region into the respective specified containers Ct. For example, the output interface OIF of the container Ct of the twin functional unit HWAAT may be connected both to a comparison logic CL for integrity check, and also directly to the output interface OIFe for forwarding data to other units of the electronic component BE.

In a loading step 102, which is executed during runtime or during operation of the electronic component BE, one or more reloadable functional units HWAA1, HWAA2 are loaded into the corresponding sub-regions or containers C1, C2 of the dynamically reconfigurable part DPR of the electronic component BE. This means that a functional unit HWAA1, HWAA2 is loaded, generally from an external storage unit (e.g., flash memory, SD card, manufacturer-specific application store) in the form of a configuration file (i.e., in the form of a bitstream file) into a sub-region or container C1, C2 of the dynamically reconfigurable region DPR, which has the interfaces IIF, OIF for input and output data suitable for the functional unit HWAA1, HWAA2. The container C1, C2 with the configuration file of the loaded reloadable functional unit HWAA1, HWAA2 is then configured accordingly to make the executable reloadable functional unit HWAA1, HWAA2 available in the electronic component BE for ongoing operation. Furthermore, for example, an output interface OIF of the container C1, C2 of the reloaded functional unit HWAA1, HWAA2 is for the time being only connected to the comparison logic CL.

For an execution step 103, the reloaded functional unit HWAA1, HWAA2, and the associated twin unit HWAAT are reset and started. In the execution step 103, the loaded reloadable functional unit HWAA1, HWAA2 and its associated twin unit HWAAT are then executed in parallel while being supplied with the same input data via the respective input interface IIF of the respective container C1, C2, Ct. Input data may be, for example, the input data occurring during normal operation of the electronic component BE. Ideally, a predefined test data sequence (e.g., test sequence, and/or test vector) is used for checking the integrity.

During the execution step 103, output data is then generated by the loaded reloadable functional unit HWAA1, HWAA2, and the associated twin functional unit HWAAT according to their functionality and according to the implemented algorithm, respectively. These output data are then compared in a comparison step 104. For this purpose, the output data of the reloaded functional unit HWAA1, HWAA2 and the output data of the associated, functionally identical twin functional unit HWAAT are fed to the comparison logic CL, which is also provided in the dynamically reconfigurable region DPR. To ensure that the reloaded functional unit HWAA1, HWAA2 executes its functionality as expected, a time duration can be specified for the comparison with the output data of the associated twin functional unit HWAAT, during which the output data of the reloaded functional unit HWAA1, HWAA2 should match the output data. This time duration can be determined, for example, by the length of the specified test data sequence.

If a match between the output data of the loaded reloadable functional unit HWAA1, HWAA2 and the associated, functionally identical twin functional unit HWAAT is detected by the comparison logic CL in the comparison step 104, for example, for the duration of the predetermined time duration, then the functional unit HWAA1, HWAA2 reloaded at runtime is enabled in an enabling step 105. That is, the output data of the functional unit HWAA1, HWAA2 will then be forwarded, e.g., directly to the output interface OIFe for forwarding data to other units of the electronic component BE. A connection of the functional unit HWAA1, HWAA2 to the comparison logic CL can be disconnected, for example, and instead a corresponding connection to the output interface OIFe for forwarding data to other units of the electronic component BE can be established.

Furthermore, the connections of the associated twin functional unit HWAAT to the comparison logic CL and to the output interface OIFe for forwarding data to other units of the electronic component BE can also be disconnected. Alternatively, the twin functional unit HWAAT may remain in communication with the output interface OIFe for forwarding data to other units of the electronic component BE. After the enabling step 105, the twin functional unit HWAAT can be used for making further integrity checks of reloaded functional units HWAA1, HWAA2 with the same functionality.

If it is detected in the comparison step 104 that the output data of the loaded reloadable functional unit HWAA1, HWAA2 deviate from the output data of the corresponding twin functional unit HWAAT, e.g., during the predetermined time duration, then the loaded reloadable functional unit HWAA1, HWAA2 is disabled or not enabled in an alarm step 106. Furthermore, an alarm or error message may be output in the alarm step 106, which provides an alert about the failed integrity check of the functional unit HWAA1, HWAA2.

Figure 3A:
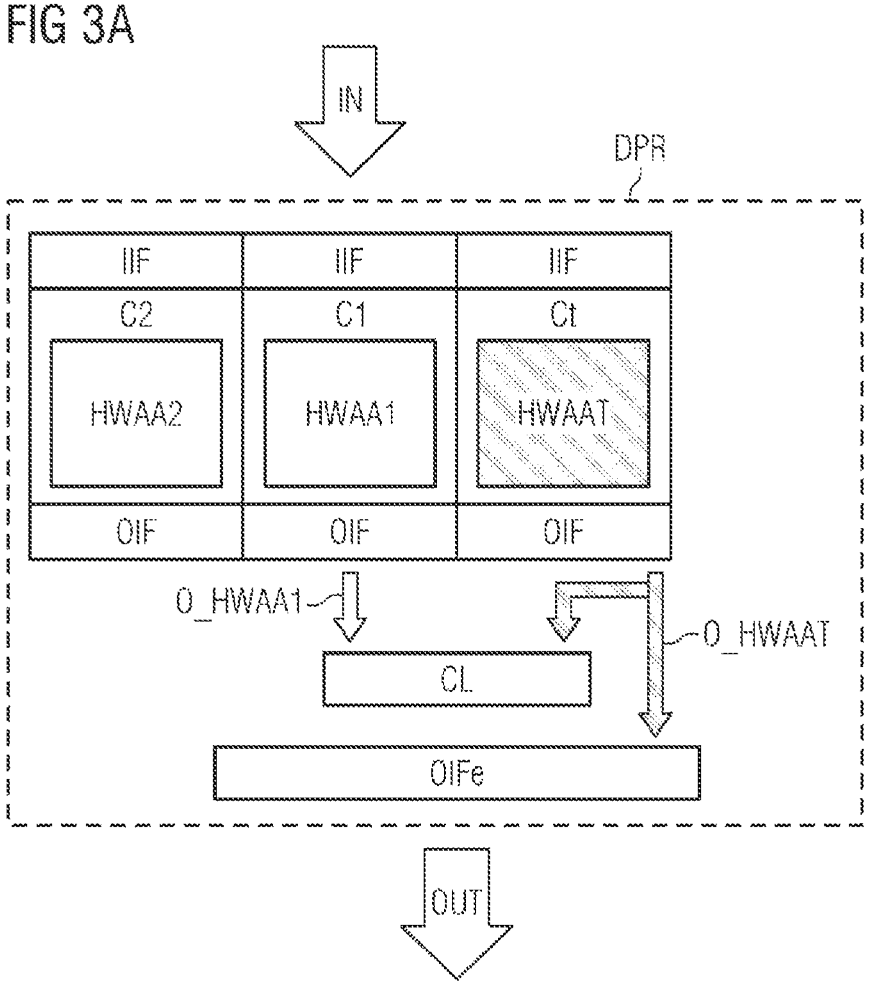
FIG. 3*a* and FIG. 3*b* show an exemplary data flow during and after the method in accordance with the invention for checking the integrity of reloadable functional units in an exemplary electronic component set up to carry out the method according to the invention.

An exemplary representation of a data flow during the execution step 103 and the subsequent comparison step 104 is shown in FIG. 3*a*, with the dynamically reconfigurable region DPR of the electronic component BE shown schematically as an example in FIG. 1, which is set up to perform the method in accordance with the invention. For checking the integrity, a twin functional unit HWAAT is provided in the container Ct, which has the same standard functionality as a functional unit HWAA1 reloaded into the first container C1 at runtime of the component BE.

In the execution step 103, identical or the same input data IN (e.g., test sequence, test vector) are supplied via the respective input interface IIF to the reloaded functional unit HWAA1 and to the associated twin functional unit HWAAT, which are processed in parallel by the functional unit HWAA1 and the twin functional unit HWAAT. The functional unit HWAA1 generates the output data O_HWAA1 based on the input data IN in accordance with its functionality, and the output data O_HWAA1 is then forwarded to the comparison logic CL via the output interface OIF of the container C1. The twin functional unit HWAAT generates the output data O_HWAAT from the input data IN in accordance with its functionality, which corresponds to the functionality of the functional unit HWAA1. The output data O_HWAAT from the twin functional unit HWAAT are forwarded via the output interface OIF both to the comparison logic CL and directly to the output interface OIFe of the dynamically reconfigurable region DPR or from there as output data OUT to system units of the electronic component BE, which are arranged, e.g., in the static region SBE.

Figure 3B:
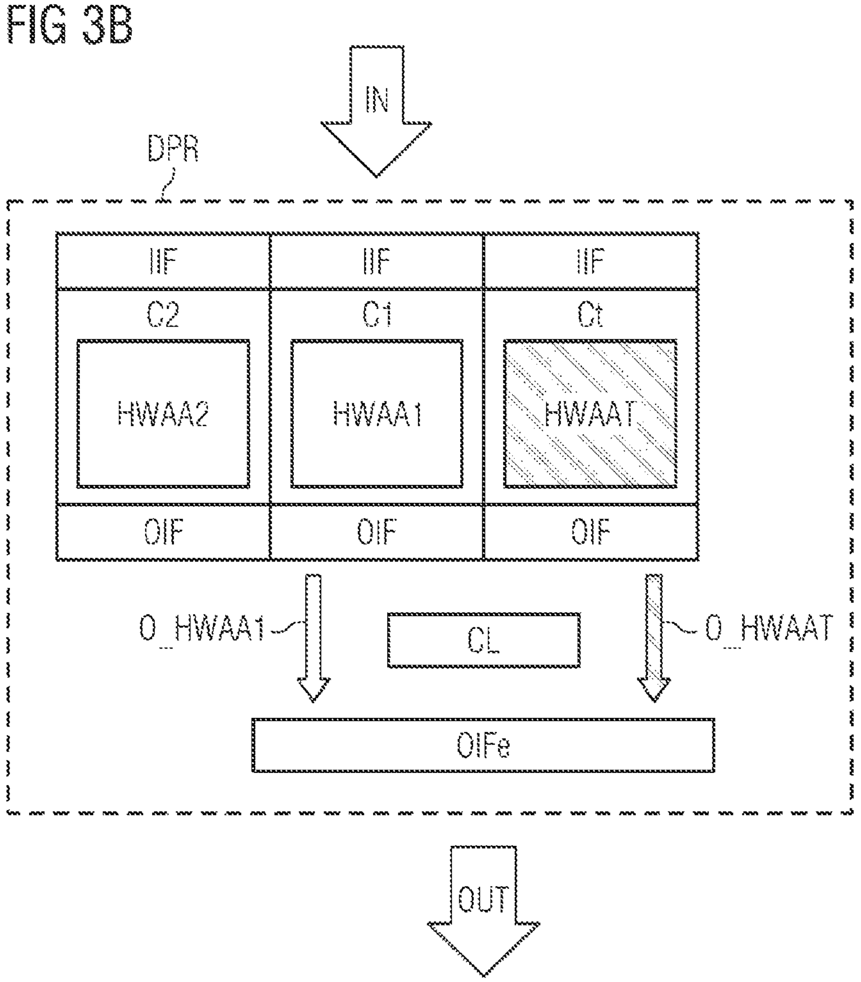

In the comparison step 104, the comparison logic compares the output data O_HWAA1 from the reloaded functional unit HWAA1 and the output data O_HWAAT from the associated twin functional unit HWAAT. If the respective output data O_HWAA1, O_HWAAT match, then a change in the data flow occurs in the enabling step 105, by enabling the loaded, reloadable functional unit HWAA1. FIG. 3*b* shows an exemplary data flow after the loaded, reloadable functional unit HWAA1 is enabled via the dynamically reconfigurable region DPR of the electronic component BE shown schematically as an example in FIG. 1, which is set up to implement the method in accordance with the invention.

After the loaded, reloadable functional unit HWAA1 has been enabled, it is connected directly to the output interface OIFe of the dynamically reconfigurable region DPR or from there to system units of the electronic component BE. The connection to the comparison logic CL established in loading step 102 is disconnected. This means that the output data O_HWAA1 generated from the input data IN by the functional unit HWAA1 is now forwarded directly as output data OUT to the system units of the electronic component BE, because the integrity of the functional unit HWAA1 has been checked and established. Furthermore, the connection of the twin functional unit HWAAT, associated with the functional unit HWAA1, to the comparison logic CL is disconnected. In addition, the connection of the twin unit HWAAT to the output interface OIFe of the dynamically reconfigurable region DPR or from there to system units of the electronic component BE can also be disconnected. Alternatively, however, this connection can also be retained, as shown by way of example in FIG. 3*b*. The trustworthy twin unit HWAAT can now be used for further integrity checks of functional units HWAA1, HWAA2 that can be reloaded into the dynamically reconfigurable region DPR of the electronic component BE and have the same standard functionality as the twin functional unit HWAAT.

Thus, while there have been shown, described and pointed out fundamental novel features of the invention as applied to a preferred embodiment thereof, it will be understood that various omissions and substitutions and changes in the form and details of the methods described, and in their operation, may be made by those skilled in the art without departing from the spirit of the invention. For example, it is expressly intended that all combinations of those method steps which perform substantially the same function in substantially the same way to achieve the same results are within the scope of the invention. Moreover, it should be recognized that method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for checking an integrity of reloadable functional units which are reloaded, as configuration files during a runtime of an electronic component formed as a programmable integrated circuit, into sub-regions of a dynamically reconfigurable region of the electronic component, the reloadable functional units including predefined interfaces which match corresponding interfaces of those sub-regions of the dynamically reconfigurable region of the electronic component into which the reloadable functional units are loadable, the method comprising:

preconfiguring, for each reloadable functional unit, a predetermined sub-region of the dynamically reconfigurable region with a corresponding, associated, functionally identical twin functional unit, which has a basic structure of reloadable functional units of the electronic component formed as logic circuit functions;

loading a reloadable functional unit into a predetermined sub-region of the dynamically reconfigurable region at the runtime of the electronic component;

supplying the loaded reloadable functional unit and the associated twin functional unit with identical input data and executed the loaded reloadable functional unit and an associated twin functional unit in parallel;

comparing output data of the loaded reloadable functional unit and output data of the associated twin functional unit are compared; and enabling the loaded reloadable functional unit and forwarding the output data of the loaded reloadable functional unit when a match is detected between the output data of the reloadable functional unit and the output data of the associated twin functional unit.

2. The method as claimed in claim 1, wherein the loaded reloadable functional unit is disabled and an alarm message is output if the output data of the loaded reloadable functional unit deviates from the output data of the associated twin functional unit.

3. The method as claimed in claim 1, wherein the output data of the reloadable functional unit and the output data of the associated twin functional unit are forwarded to a comparison logic for comparison.

4. The method as claimed in claim 2, wherein the output data of the reloadable functional unit and the output data of the associated twin functional unit are forwarded to a comparison logic for comparison.

5. The method as claimed in claim 3, wherein the comparison logic is statically configured in the dynamically reconfigurable region of the electronic component.

6. The method as claimed in claim 1, wherein the output data of the reloadable functional unit and the output data of the associated twin functional unit are compared for a predetermined time duration.

7. The method as claimed in claim 1, wherein a predetermined test data sequence is used as input data for the comparison of the output data of the reloadable functional unit and the output data of the associated twin functional unit.

8. The method as claimed in claim 1, wherein the twin functional unit, which is configured for each reloadable functional unit, is loaded from a secure and trusted memory region into the predetermined sub-region of the dynamically reconfigurable region of the electronic component.

9. The method as claimed in claim 1, wherein a respective configuration file for a respective reloadable functional unit is executed as a bitstream file, which is reloaded from an internal or external storage unit at the runtime of the electronic component.

10. The method as claimed in claim 1, wherein the electronic component comprises a field programmable gate array.

11. The method as claimed in claim 1, wherein the electronic component comprises a system-on-chip field programmable gate array.

* * * * *